UNITED STATES PATENT OFFICE.

WERTHER ANDERS GUSTAF VON HEIDENSTAM AND KARL LOUIS FELIX FRIEDEMANN, OF STOCKHOLM, SWEDEN.

PROCESS OF PRESERVING WOOD.

937,802.   Specification of Letters Patent.   Patented Oct. 26, 1909.

No Drawing.   Application filed February 4, 1909.   Serial No. 476,073.

*To all whom it may concern:*

Be it known that we, WERTHER ANDERS GUSTAF VON HEIDENSTAM and KARL LOUIS FELIX FRIEDEMANN, subjects of the King of Sweden, and residents of Stockholm, Sweden, have invented a new and useful Improved Process of Preserving Wood, of which the following is a specification.

This invention relates to an improved process of preserving wood.

From a good preserving substance is required: (1) that it should be strongly antiseptic and practically insoluble in water; (2) that it can be easily distributed in the wood or in the outer layers thereof, and; (3) that it is economical in use.

The solution of salts, sulfate of copper and chlorid of zinc, formerly generally used for impregnating wood with a view of preserving the same correspond to the requirements 2 and 3, inasmuch as they can be well distributed in the parts of the wood requiring preservation and are comparatively economical. They are not, however, very good antiseptics, and on account of their solubility in water they can easily be washed out of the wood, and thus they do not correspond to the requirement 1. On the contrary the bodies known as phenols and constituting the preserving substance for instance of the creosote oil which is considered to be the best wood preserving fluid hitherto known, are strongly antiseptic. Experiments have proved that for instance for preserving a sleeper theoretically is required only 170 gr. creosote oil. In the most modern methods of impregnating wood to preserve same, it has, however, not been possible to use a smaller quantity of creosote oil than 7 kg. for each sleeper if a good distribution of the oil in the wood is to be effected. It is thus necessary to use a much greater quantity of creosote oil than that determined by the antiseptic capacity of said oil. Further, the phenols, at least the higher homologues, are practically insoluble in water. The first of the series, viz: carbolic acid ($C_6H_5OH$) which constitutes an essential part of the preserving substances of the creosote oil is probably less suitable for impregnating purposes than the other phenols as being more soluble in water (about 6%) and has further the strongest acid character whereby it may reduce the strength of the wood. The cresols ($C_6H_4{<}{}^{OH}_{CH_3}$) are less soluble in water (about 2%) and have not so strong acid character consequently they cannot have any disadvantageous influence on the wood. They are also more strongly antiseptic than the carbolic acid. The cresols are thus preferable for preserving purposes.

It is not expedient to impregnate wood with cresol or the like. It is however, expedient to use solutions of combinations of phenols soluble in water which according to the requirements allow different concentrations and have the capacity of distributing themselves in the wood without injuring the latter. The form of the cresol most suitable in the above respects is the calcium salt, calcium cresate, which is an impregnating substance corresponding to very high requirements inasmuch as: (1) calcium cresate is soluble in water and the solution thereof can be concentrated or diluted at will, (2) the cresol has such a weak acid character that it can be set free from its calcium salt even by the influence of such a weak acid as carbonic acid, and (3) the calcium salt in the parts of the wood where it is not decomposed has a much better antiseptic effect than the free cresol.

When the impregnating and preserving fluid has been introduced into the wood the phenols are to be freed in the outer layers of the wood in order to produce a protecting layer of carbonate of lime. This may when using a solution of calcium cresate be effected most conveniently by subjecting the impregnated wood to the action of the atmospheric air, the carbonic acid of the air gradually combining with the lime to form chalk. If it is desired to obtain more rapidly a fixation of the preserving substance in the surface layers of the wood, the latter may for instance while remaining in the impregnation apparatus be subjected to the action of combustion gases from a fire-place by having the said gases flow through the apparatus. For the same purpose the wood obviously may be treated with other gas mixtures containing carbonic acid.

The solution successfully used by us in practice contains about 4% of calcium cresate, and to each cubic foot of wood we have employed about one and one-third gallons of the solution.

Inasmuch as the present method may be carried out in apparatus of any well known or suitable construction it is possible, by choosing different concentrations, to distribute in the wood just the quantity of the preserving substance required or desired, and on account thereof the present method is much more economical than the methods heretofore known even than the impregnation with sulfate of copper or chlorid of zinc.

Having now described our invention, what we claim as new and desire to secure by Letters-Patent, is:

1. The process of preserving wood which consists in impregnating wood with solutions of combinations of phenols with alkaline earths alone, and then subjecting the wood to the action of a gas-mixture containing carbonic acid, substantially as and for the purpose set forth.

2. The process of preserving wood which consists in impregnating wood with a water solution of calcium cresate alone, and then subjecting the wood to the action of a gas-mixture containing carbonic acid, substantially as and for the purpose set forth.

In testimony that we claim the foregoing as our invention, we have signed our names in presence of two subscribing witnesses.

WERTHER ANDERS GUSTAF VON HEIDENSTAM.
KARL LOUIS FELIX FRIEDEMANN.

Witnesses:
   CONRAD DELMAR,
   RUTH PETERSSON.